(12) United States Patent
Nagai et al.

(10) Patent No.: US 7,593,947 B2
(45) Date of Patent: Sep. 22, 2009

(54) SYSTEM, METHOD AND PROGRAM FOR GROUPING DATA UPDATE REQUESTS FOR EFFICIENT PROCESSING

(75) Inventors: Izumi Nagai, Nishitokyo (JP); Yohichi Hoshijima, Funabashi (JP); Kazuoki Takahashi, Yokohama (JP)

(73) Assignees: IBM Corporation, Endicott, NY (US); The Bank of Tokyo-Mitsubishi UFJ, Ltd., Tokyo (JP)

( * ) Notice: Subject to any disclaimer, the term of this patent is extended or adjusted under 35 U.S.C. 154(b) by 437 days.

(21) Appl. No.: 10/802,471

(22) Filed: Mar. 16, 2004

(65) Prior Publication Data

US 2005/0004996 A1  Jan. 6, 2005

(30) Foreign Application Priority Data

Mar. 24, 2003 (JP) ............... 2003-080168

(51) Int. Cl.
G06F 7/00 (2006.01)
(52) U.S. Cl. ......................... 707/100; 712/21
(58) Field of Classification Search ............... 707/101, 707/1, 100; 370/230; 712/21, 204, 205, 712/214
See application file for complete search history.

(56) References Cited

U.S. PATENT DOCUMENTS

| | | | | |
|---|---|---|---|---|
| 6,044,061 | A * | 3/2000 | Aybay et al. ............... | 370/230 |
| 6,219,689 | B1 | 4/2001 | Mori ............................ | 709/101 |
| 6,914,881 | B1 * | 7/2005 | Mansfield et al. ........... | 370/230 |
| 6,920,447 | B2 * | 7/2005 | Pudipeddi et al. ............. | 707/3 |
| 7,296,008 | B2 * | 11/2007 | Passerini et al. ............... | 707/1 |
| 2002/0078323 | A1 * | 6/2002 | Takayama et al. ............ | 712/205 |
| 2002/0156764 | A1 * | 10/2002 | Goudie et al. .................. | 707/1 |
| 2003/0005167 | A1 * | 1/2003 | Khare et al. ................. | 709/310 |
| 2003/0056088 | A1 * | 3/2003 | Heishi et al. ................. | 712/214 |
| 2003/0191907 | A1 * | 10/2003 | Weber ......................... | 711/151 |
| 2003/0208586 | A1 * | 11/2003 | Mastronardi et al. ........ | 709/223 |
| 2004/0003104 | A1 * | 1/2004 | Boskovic et al. ............ | 709/231 |
| 2004/0162989 | A1 * | 8/2004 | Kirovski ....................... | 713/189 |
| 2005/0149612 | A1 * | 7/2005 | Messinger et al. .......... | 709/200 |
| 2005/0165820 | A1 * | 7/2005 | Pudipeddi et al. ........... | 707/101 |

FOREIGN PATENT DOCUMENTS

JP          00153202 A    6/1989

* cited by examiner

*Primary Examiner*—Don Wong
*Assistant Examiner*—Angela M Lie
(74) *Attorney, Agent, or Firm*—Sughrue Mion, PLLC

(57) ABSTRACT

A system, method and program product for processing a multiplicity of data update requests made by a customer. All of the data update requests are grouped into a plurality of blocks for execution by a data processor. The data update requests within each of the blocks and from one of the blocks to a next one of the blocks are arranged in an order that the data update requests need to be executed to yield a proper data result. Each of the blocks have approximately a same capacity for the data update requests. The capacity corresponds to a number of the data update requests which the data processor can efficiently process in order before processing the data update requests in the next one of the blocks. Then, the data processor processes the data update requests within the one block in the order. Then, the data processor processes the data update requests within the next block in the order. The order is an order in which the data update requests were made. The capacity corresponds to a number of the data update requests which the data processing unit can optimally process in order in the one block before processing the data update requests in the next one of the blocks.

17 Claims, 8 Drawing Sheets

[Figure 1]
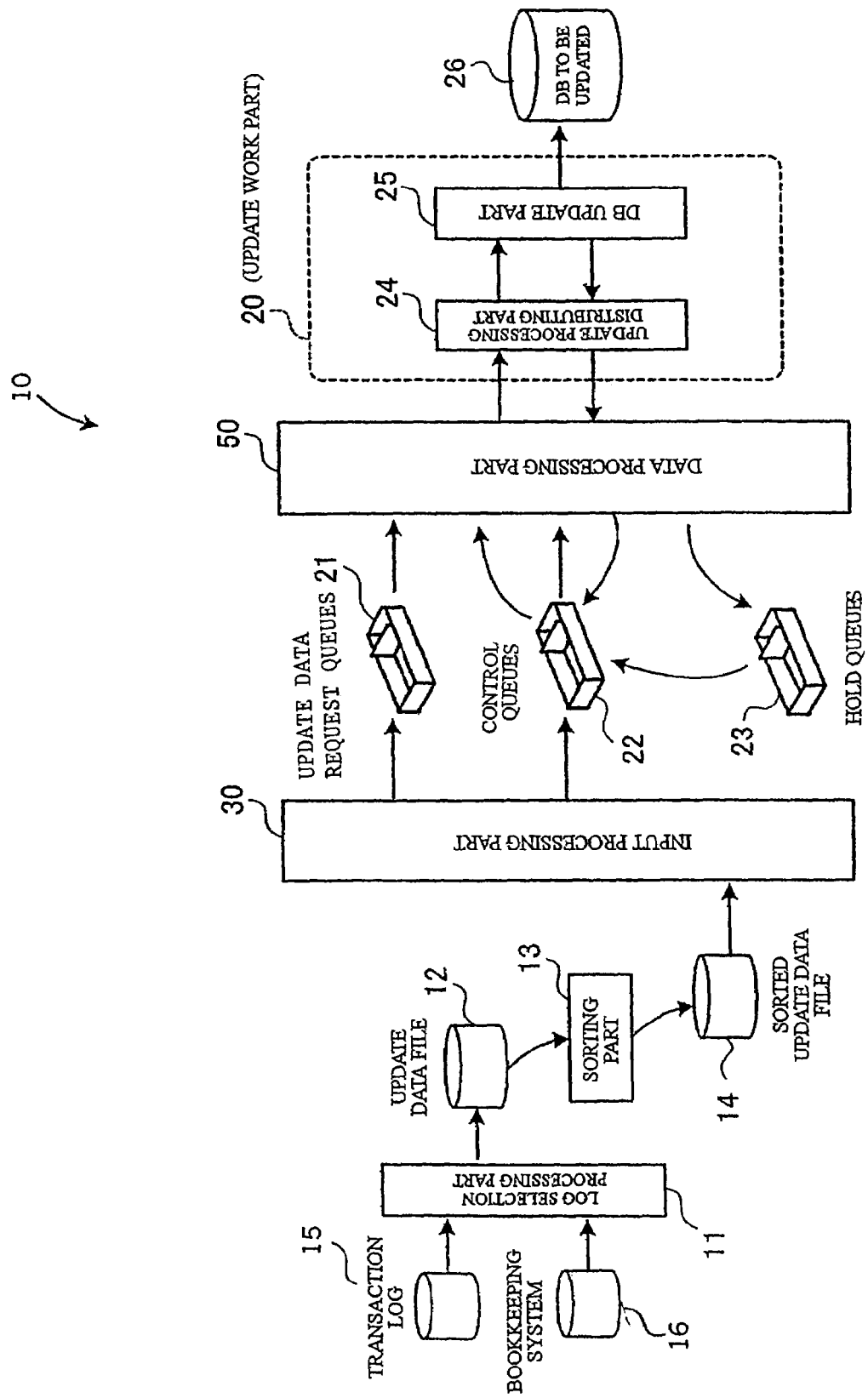

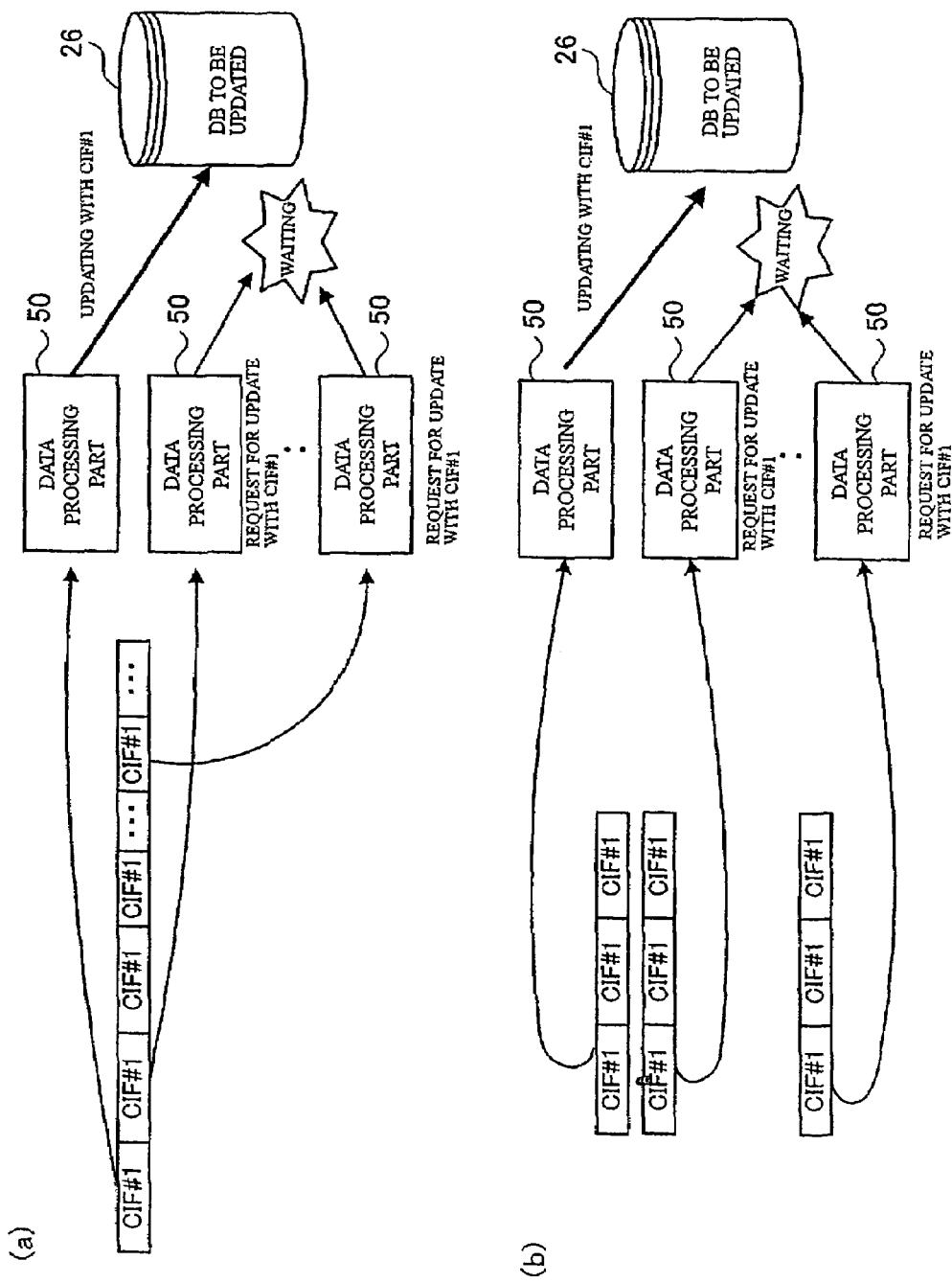
[Figure 2]

[Figure 3]
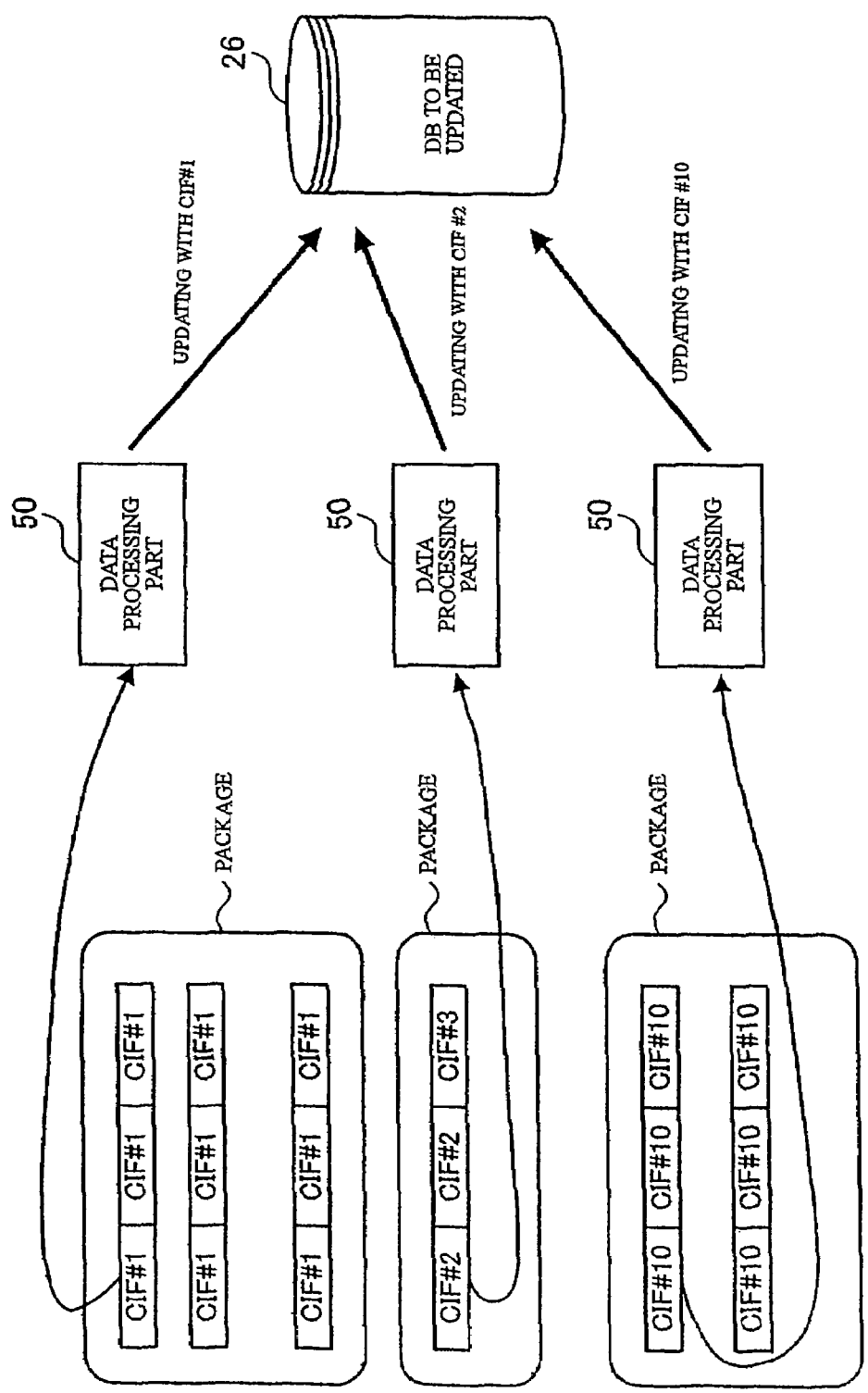

[Figure 4]
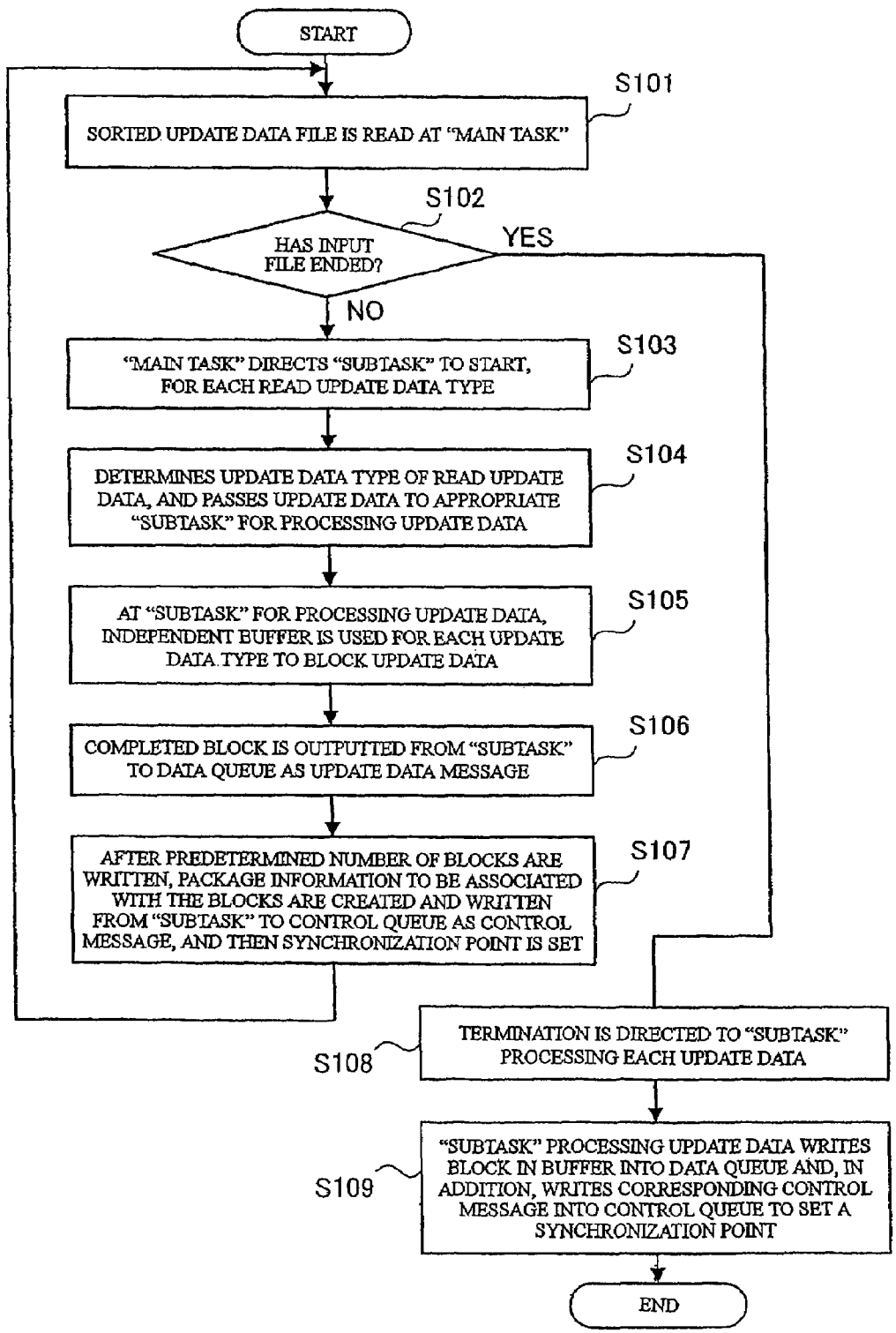

[Figure 5]
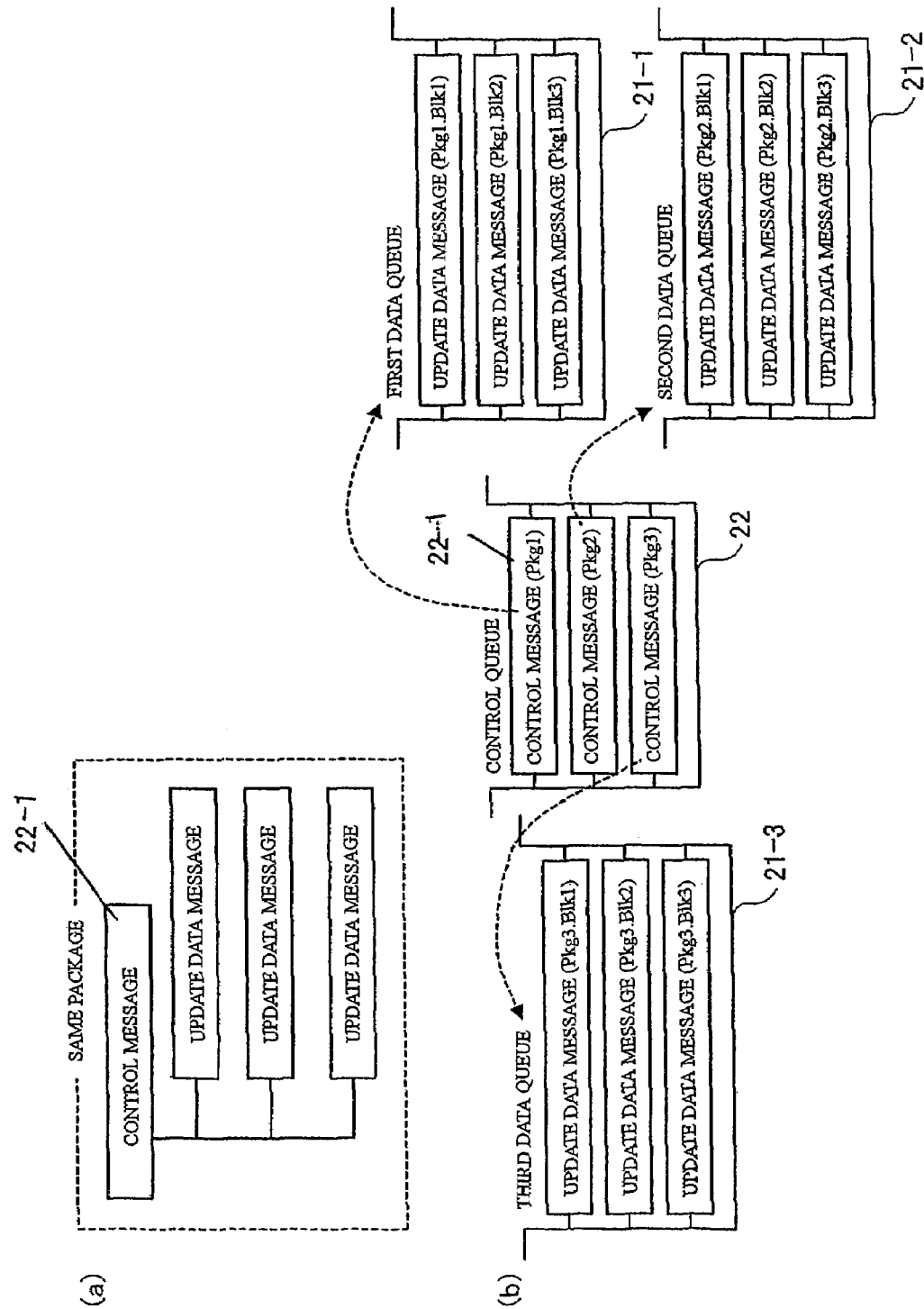

[Figure 6]
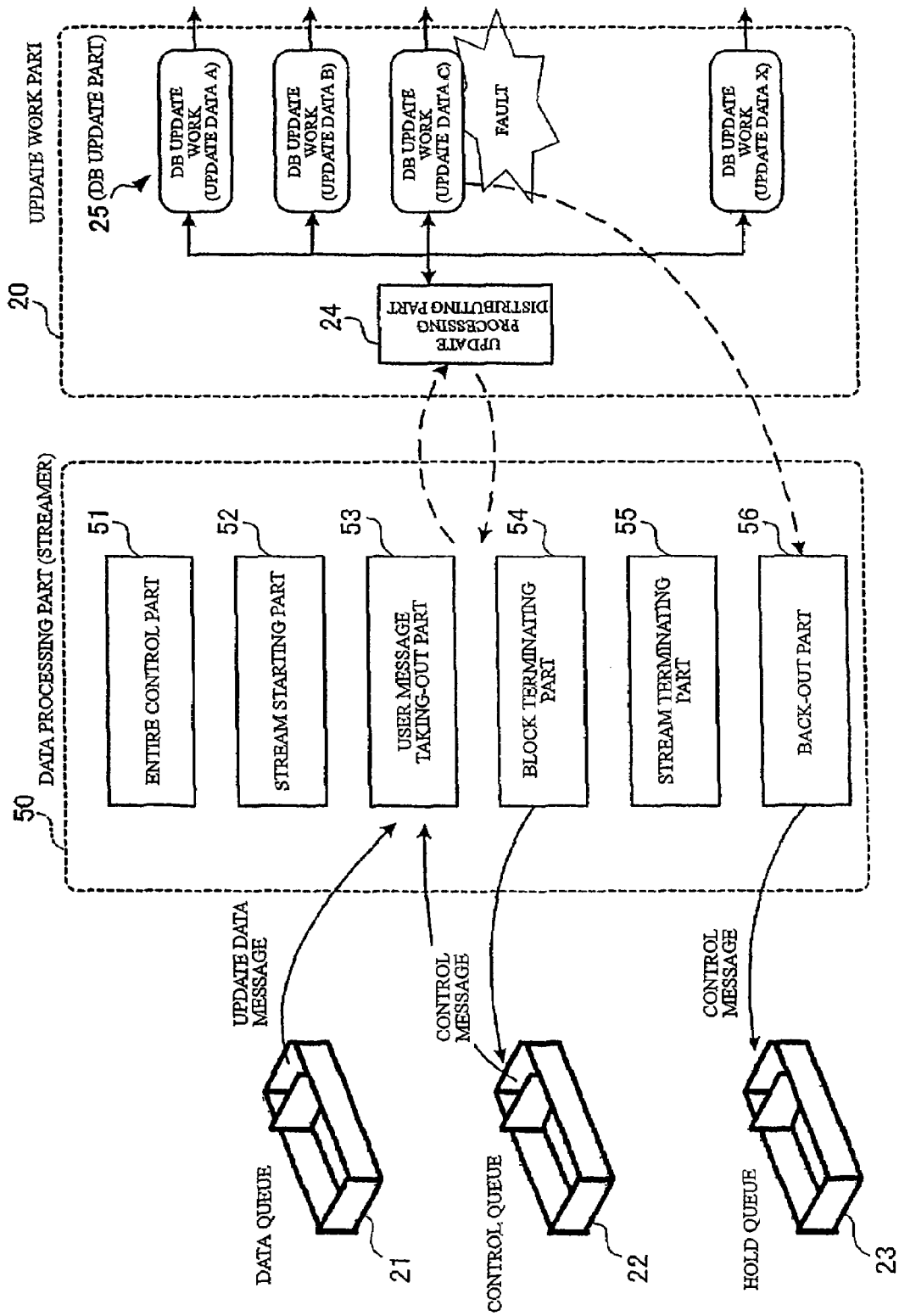

[Figure 7]
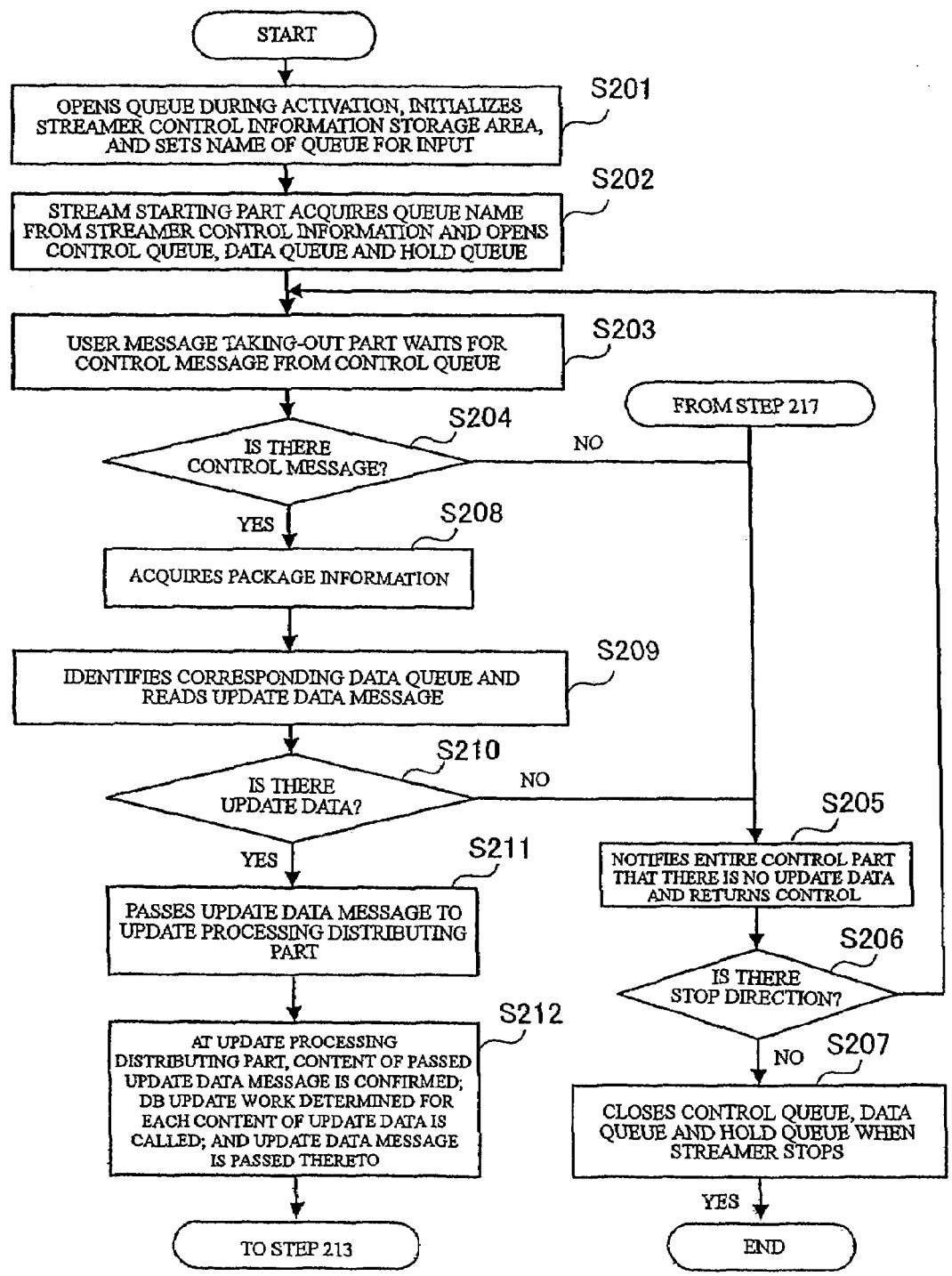

[Figure 8]
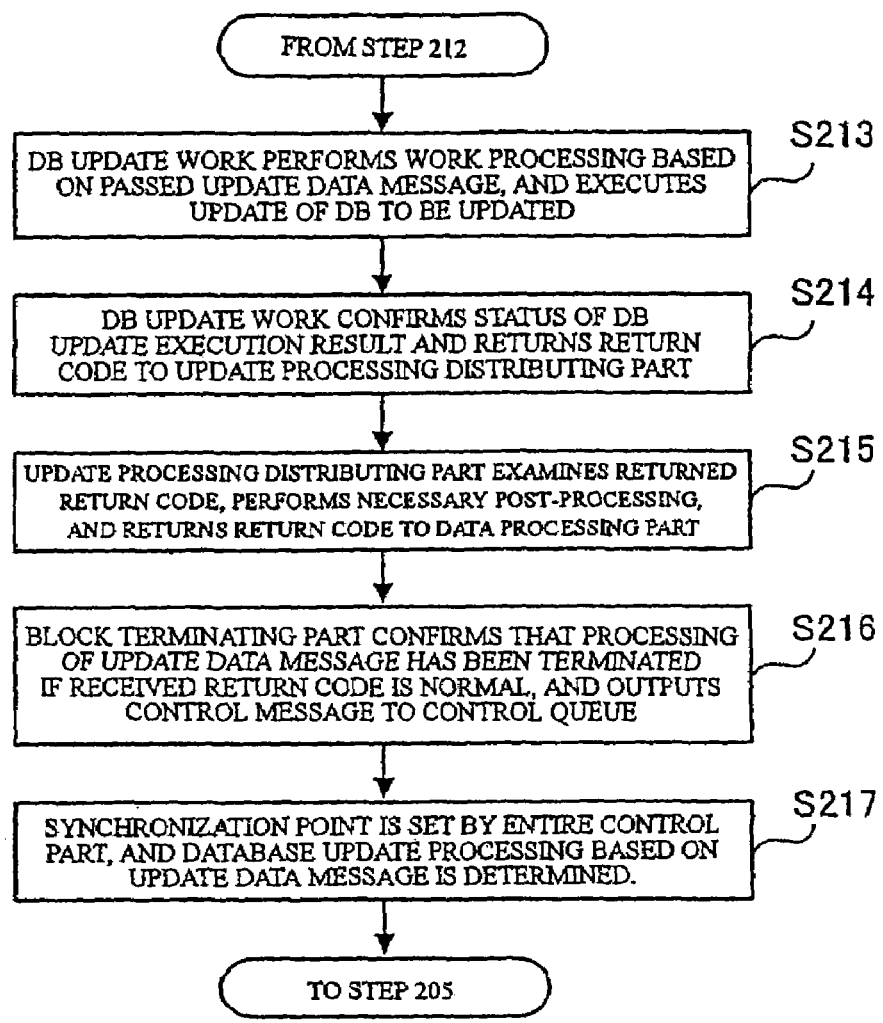

SYSTEM, METHOD AND PROGRAM FOR GROUPING DATA UPDATE REQUESTS FOR EFFICIENT PROCESSING

BACKGROUND

The present invention relates generally to computer systems, and deals more particularly with packaging of data update requests and other types of transactions to facilitate and expedite their execution.

In a known transaction processing system, a user makes a request to a server to update a database or perform another transaction, and the server handles the request. The server may use one or more queues to accumulate the requests before handling them. The requests on the queue can be processed sequentially, although this tends to be slow. U.S. Pat. No. 6,219,689 to Mori (which corresponds to Published Unexamined Patent Application No. 11-53202, pp. 3-4 and FIG. 1) discloses a transaction processing system which improves processing speed by parallel processing of requests independently, as follows. A parallel transaction processing system processes in parallel multiple tasks. The system includes a queue for storing a plurality of transaction data which can be processed independently, a control table containing control information for the queue and means for operating a plurality of tasks which performs the same processing on the transaction data stored in the queue. Each of the operated tasks reserves a predetermined number of consecutive transaction data for processing among unprocessed transaction data stored in the queue by referencing the control table, writes its reservation status in the control table and, upon having processed the reserved transaction data, writes its processing status in the control table.

A transaction handling system for a financial institution poses additional challenges. Multiple complicated conditions must be satisfied by the transaction handling system, such as (i) handling tens of millions of data update requests per day, (ii) handling various types of log file formats provided by other systems, (iii) updating various databases, and (iv) accommodating rapid increases in the number of transactions. Also, many data update requests may be made at predetermined time intervals, and these must be handled within a limited time.

FIGS. 2(a) and 2(b) illustrate prior art examples of processing of data update requests performed when multiple data processing parts (streamers) 50 update a database with the same key, for example, CIF#1. A "key" is an index for database records to be updated. As shown in FIG. 2(a), if these multiple records are directly processed in parallel at the data processing part (streamer) 50, delay is caused because the multiple data processing parts ("streamers") 50 update the database with the same key. As a result, parallel processing cannot be performed without significant delay which makes the system performance worse. FIG. 2(b) illustrates a known solution of blocking requests, to address in part the problem of FIG. 2(a). However, in the arrangement of FIG. 2(b), the block length is restricted; for example, a block may be restricted to a length less than several tens of kilobytes. An example is now described where the same key is used for a number of data update request which is greater than the maximum block length. For example, the maximum block length is thirty requests, and there are a hundred requests having the same key. In this example, it is impossible to block all these hundred requests into one block. In such a case, for example, three blocks of thirty requests each and one block of ten requests are created where all the requests have the same key. Nevertheless, when the four blocks having the same key are processed in parallel at the data processing part (streamer) 50, database contention may be caused. That is, delay may be caused and, as a result, the parallel processing can not be performed without significant delay which makes the system performance worse.

A general object of the present invention is to rapidly process data update requests and other types of transactions.

A more specific object of the present invention is to improve the rate of parallel processing of data update requests and other types of transactions.

Another object of the present invention is to minimize database contention from different terminals when handling data update requests and other types of transactions.

Another object of the present invention is to rapidly process data update requests and other types of transactions despite a program fault.

SUMMARY OF THE INVENTION

The invention resides in a system, method and program product stored on a computer readable medium for processing a multiplicity of data update requests made by a customer. All of the data update requests are grouped into a plurality of blocks for execution by a data processor. The data update requests within each of the blocks and from one of the blocks to a next one of the blocks are arranged in an order that the data update requests need to be executed to yield a proper data result. Each of the blocks have approximately a same capacity for the data update requests. The capacity corresponds to a number of the data update requests which the data processor can efficiently process in order before processing the data update requests in the next one of the blocks. Then, the data processor processes the data update requests within the one block in the order. Then, the data processor processes the data update requests within the next block in the order.

According to features of the present invention, the order is an order in which the data update requests were made. The capacity corresponds to a number of the data update requests which the data processing unit can optimally process in order in the one block before processing the data update requests in the next one of the blocks. The data update requests within each of the blocks are arranged into the order by order information stored within or associated with the blocks.

The invention also resides in a system, method and program for updating a database based on data update requests. An order in which the data update requests were made is determined. The data update requests are grouped into blocks, wherein each of the blocks includes a plurality of data update requests and information indicating the order to process each of the data update requests. Information indicating a sequence in which to execute the blocks is generated and stored based on the order. Each of the data update requests within all of the blocks are executed based on the order by a same processor. Each of the blocks preferably has a same predetermined capacity for data update requests.

According to other features of the present invention, the physical grouping of blocks is performed by a subtask of an input processing part. A plurality of the blocks are logically grouped as a package by a subtask of an input processing part. Consequently, the blocks within each package are processed sequentially, not in parallel. The different packages can be processed in parallel. Information defining the order for executing each block within each package is created for each package and stored in a control queue. A data processing part ("streamer") reads the package information stored in the control queue and processes a package accordingly. This enables parallel processing of multiple packages and also enables sequential processing of the blocks contained in one package. The use of the common control queue minimizes database contention.

The present invention can also include a hold queue, in case of a fault in processing a data update request from a block, to temporarily hold package information related to the block. In such a case, processing can bypass the data update request which caused the fault, without moving the data update request from the data queue.

BRIEF DESCRIPTION OF THE FIGURES

FIG. 1 is a block diagram illustrating a database update processing system according to the present invention.

FIGS. 2(a) and 2(b) are flow diagrams illustrating database update processing according to the prior art.

FIG. 3 is a flow diagram illustrating database update processing according to the present invention.

FIG. 4 is a flowchart illustrating a process performed by an input processing part.

FIGS. 5(a) and 5(b) are flow diagrams illustrating association between requests and association between queues.

FIG. 6 is a flow diagram illustrating a functional configuration of a data processing part (streamer).

FIG. 7 is a flowchart illustrating part of a process performed mainly by a data processing part (streamer).

FIG. 8 is a flowchart illustrating the remainder of the process of FIG. 7 performed mainly by a data processing part (streamer).

DETAILED DESCRIPTION OF THE PREFERRED EMBODIMENTS

The present invention will now be described in detail with reference to the figures. FIG. 1 illustrates a database update processing system generally designated 10 according to the present invention. The database update processing system 10 comprises a log selection processing part 11, an update data file 12, a sorting part 13, a sorted update data file 14, and an input processing part 30. (The term "part" as used herein includes hardware, firmware and/or software.) A transaction log 15 contains log records for requested updates of various databases through transaction processing. The log records were created by an accounting system, for example. The log selection processing part 11 reads/extracts update requests from the transaction log 15, and selects which updates to be made in database 26. This selection is based on whether or not a record to be updated by the data update request exists in database 26. These data update requests are accumulated in the update data file 12 in the order of processing by a bookkeeping system 16. The sorting part 13 sorts the contents of the update data file 12 according to primary keys and an update serial number of the data update request. Each "primary key" is a primary database index to identify a database record to be updated. A primary key indicates, for example, an account number of a customer in the accounting system. Each "update serial number" is an identification number for a respective update request extracted from the transaction log. The "update serial numbers" are given by the log selection processing part 11 to reflect the order in which the data update requests should be processed. The bookkeeping system 16 and sorting part 13 order the data update requests such that will later be executed in the order in which the data update requests were made. Each data update request has a time stamp which was assigned when the data update request was made and is recorded in the log. This time stamp is used to order the data update requests for processing, although there may be other factors as well that dictate the requisite order within the blocks and processing order. The sorted update data file 14 is a sequential file for which the contents have been sorted by the sorting part 13 in an ascending order of primary keys and the DB update serial numbers. The input processing part 30 performs log reading and distributing processing based on data stored in the sorted update data file 14. (This is the transaction log which is already sorted by the sorting part 13). Data update requests are distributed such that each block includes data update requests which update the same record in database 26.

The database update processing system 10 further comprises a data queue 21, a control queue 22, a hold queue 23, and a data processing part ("streamer") 50. The data queue 21 stores/accumulates blocks which are each composed of n data update requests. The control queue 22 stores/accumulates package information (i.e. the number of blocks and the name of data queue 21) for packages. A "package" comprises multiple blocks of data update requests. The hold queue 23 stores/accumulates control messages saved during processing of data update requests, in case of a program fault at the data processing part 50. The data processing part (streamer) 50, which is a processing task, acquires a data update request from the data queue 21 and processes the data update request.

The database update processing system 10 also includes an update work part 20 which comprises an update work program for receiving data update requests from the data processing part 50 and updating a database 26 accordingly. The update work part 20 comprises an update processing distributing part 24 and a DB update part 25. The DB update part 25 comprises multiple DB update programs. The update processing distributing part 24 receives a block from the data processing part 50. Then, the update processing distributing part 24 determines, based on the content of the received block, a DB update part 25 to which the received block should be passed. The DB update part 25 "deblocks" a received block, i.e. separates the data update requests within each block. Then, the DB update part 25 executes the data update requests for a corresponding DB such as database 26.

Packaging and blocking according to the present invention are now described with reference to FIG. 3. A "block" comprises a predetermined number of data update requests. All the data update requests in each block have the same key. A "key" is an index, i.e. an identification number for each Customer Information File ("CIF"), for database records to be updated. The key is used for identifying a record in the database 26. In FIG. 3, "CIF #1" is one key, "CIF #2" is another key, and "CIF #3" is another key. A "package" is a collection of blocks all having the same key. There is a separate data processing part 50 for each package. The capacity of data update requests in each block is based on the number of data update requests within a block that the respective data processing part can efficiently or optimally process in order, before processing the data update requests in the next block in the same package. Typically, each block in a package is filled with data update requests before the next block in the sequence is filled with data update requests to ensure most efficient processing by the respective data processing part. The number of data update requests that a data processing part can optimally process in order, i.e. the block size, is a predetermined value based on statistical analysis or performance, i.e. through testing of different block sizes, which block size results in best performance. Alternately, the predetermined value of block size can result from limitations of middleware or other programming that is involved in handling the block or its processing. For example, if an IBM MQ Series middleware program is used to implement the update processing distributing part 24, this middleware program has a desired block size.

The example of FIG. 3 illustrates three data update requests per block, although typically there are many more data update requests in each block. Blocks which belong to the same package should be processed sequentially in their order within the block. By grouping blocks into packages with a common key and dedicating each data processing part to a separate package, the different data processing parts ("streamer") 50 do not contend with each other. Also, by sizing each block for optimum processing by a respective data processing part, improved processing speed is attained. For example, if there are ninety data update requests having the same key, these can be divided into three blocks of thirty data update requests each. If there are more than ninety data update requests but less than one hundred twenty data update requests, the data update requests over ninety can be grouped into a fourth block. All four blocks can be grouped into the same package. In this example, a block of thirty data update requests is the optimum number for data processing part 50 to process in order, before processing the data update requests of the next block in the same package. The data processing part 50 processes the data update requests in each block sequentially, and after completing processing of the data update requests in a block, the data processing part 50 processes the data update requests in the next block in the package. Because there is a different data processing part 50 assigned to each package, the data update requests in each package are processed in parallel.

FIG. 4 is a flowchart showing a process performed by the input processing part 30. Output from the input processing part 30 is written into the data update request queue 21 and the control queue 22. Processing on the input side is executed as "a main task" and processing on the output side is executed as "a subtask" in order to efficiently process mass amounts of data update requests. At the input processing part 30, the "main task" responsible for the input-side processing is started first (step 101). The sorting part 13 sorts data update requests based on primary key. The main task reads the sorted data update requests (and also controls subtasks). The main task then groups the sorted data update requests into blocks based on commonality of keys, time-stamps of transactions and any other factors which influence the requisite order of execution. Generally, the order in which the data update requests are made is the order in which they are executed and therefore, the order in which they are sequenced within each block and from block to block within the same package. Otherwise, the record resulting after all the data update requests with the same key are executed may be incorrect. For each data update request read from the sorted data update file (decision 102, no branch), the main task directs the subtasks responsible for the output-side processing of each data update request type to start processing (step 103). The data update request type indicates the database in which the record to be updated belongs. Next, the main task determines the type of data update request and passes it to an appropriate subtask for processing (step 104). The function of the subtask is to generate blocks of data update requests of the same type, and write the generated blocks onto the data queue 21. The subtask determines the type of data update request by investigating a "record type" code which accompanies the data update request. This is performed as follows. The subtask uses an independent buffer for each data update request type to block the data update requests (step 105). The buffer in which blocking is executed is a storage area acquired within an address space of the input processing part 30. The subtask outputs a completed block of data update requests from the buffer to the data queue (step 106). This block is also called an "update data message".

After a predetermined number of blocks of data update requests of the same type are written into data queue 21, the subtask associated with the blocks writes control/package information into the control queue 22 with reference to the blocks. This control information logically combines the blocks (of the same data update request type) into a "package" (Step 107). Then, a synchronization point is set to indicate that update of a database or update of messaging is finalized within the range of a work unit (a period since a set of changes is started until it is completed). Then, the process returns to step 101, and the same process is repeated for the next data update request. After all the data update requests have been processed by steps 101-107 (decision 102, yes branch), the main task directs the subtasks to terminate their processing (step 108). In response, the subtasks write a block of data update requests from the buffer into the data queue 21 (step 109). Also, the substasks write control messages corresponding to the blocks into the control queue 22, and set a synchronization point (step 109). Then the input processing ends. This synchronization point indicates that update of messaging is finalized within the range of a work unit (a period since a set of changes is started until it is completed). As described above, a data update request of the data queue 21 output from the input processing part 30 and a control message of the control queue 22 are in a predetermined association with each other. The control queue 22 and the data queue 21 are also in a predetermined association with each other.

FIGS. 5(*a*) and 5(*b*) illustrate the association between control messages, data update requests and the packages. FIG. 5(*a*) illustrates a control message such as 22-1 of the control queue 22 (illustrated in FIG. 5(*b*)) and three data update requests of one data queue such as 21-1. FIG. 5(*b*) shows the association between the control queue 22 and the data queues 21-1, 21-2 and 21-3. Each data update request includes a message ID. All data update requests in the same package have the same message ID, and likewise, the control message for the corresponding package has the same message ID. Thus, all data update requests in the same package have the same ID as that of their respective control message. The message ID can be set by the input processing part 30, and indicates that blocks which have the same message ID belong to the same package. Each control message contains information on processing order of blocks in each data queue. The processing order of blocks is based on package information. Each data update "message" comprises one or more blocks of data update requests within the same package. In the example of FIG. 5(*b*), three data update request queues 21, i.e. queues 21-1, 21-2 and 21-3, are associated with the control queue 22. There are one or more data update request queues 21 for each control queue 22. In this case, all data update requests in the same package are contained in the same data queue 21. In this way, multiple block data are logically associated with one another as a package unit, and a control message describing the contents thereof is created. Block data for updating a database is stored in the data queue 21 as an data update request.

FIG. 6 illustrates operation of the data processing part (streamer) 50. The data processing part 50 comprises an entire control part 51, a stream starting part 52, a user request taking-out part 53, a block terminating part 54, a stream terminating part 55, and a back-out part 56. The entire control part 51 controls the data processing part ("streamer") 50. The stream starting part 52, when activated, opens a queue and initializes control information (streamer control information)

of the data processing part (streamer) 50. The user request taking-out part 53 awaits a control message from the control queue 22. The block terminating part 54 confirms that processing of a data update request is terminated and then outputs a control message to the control queue 22. The stream terminating part 55 closes the queue when the data processing part (streamer) 50 terminates processing. The back-out part 56 outputs an appropriate control message to the hold queue 23 in case any failure caused. The DB update part 25 of the update work part 20 performs multiple DB updates.

FIGS. 7 and 8 are flowcharts showing a process executed mainly at the data processing part ("streamer") 50. The stream starting part 52 initializes a streamer control information area (a storage area acquired and managed for each data processing part 50) during activation of the data processing part (streamer) 50, and sets the name of a queue for input (step 201). The stream starting part 52 acquires the name of the queue for input from streamer control information, and opens the control queue 22, the data queue 21 and the hold queue 23 (step 202). The user request taking-out part 53 waits for a control message from the control queue 22 (step 203). Then, the user request taking-out part 53 determines whether or not there is a control message in the control queue 22 (step 204). If there is no control message in the control queue 22, the user request taking-out part 53 waits for a predetermined period of time. After the predetermined period of time, part 53 notifies the entire control part 51 that there is no data update request, and then returns control to the entire control part 51 (step 205). Then, the user request taking-out part 53 determines whether or not there is a stop request from an operator at terminal (not shown in the figures) (step 206). If there is no stop request, the process returns to step 203. If there is a stop request, the control queue 22, the data queue 21 and the hold queue 23 are closed when the data processing part ("streamer") 50 stops, and then the process ends. If there is a control message in the control queue 22 at step 204, then the user request taking-out part 53 acquires package information including the name of a data queue 21, the number of packages, the update data type (step 208). Then, the user request taking-out part 53 identifies a corresponding data queue 21 from the package information, and reads an data update request from the identified data queue 21 (step 209). Then, the user request taking-out part 53 passes the data update request to the entire control part 51. Thus, the entire control part 51 is notified that there is update data to be processed then. The entire control part 51 then proceeds based on information from the user request taking-out part 53 and whether there is update data (step 210). If there is no update data, then the process proceeds to step 205 described above. If there is update data, the entire control part 51 passes an data update request to the update processing distributing part 24, which is an update processing distributing program (step 211). At the update processing distributing part 24, the contents of the passed update data is confirmed. Then, a DB update work determined for each content of the update data in the DB update part 25 is called, and an data update request is passed thereto (step 212).

As shown in FIG. 8, in the DB update work in the DB update part 25, to which an data update request has been passed at step 211, work processing is performed based on the passed data update request, and a DB update is executed for DB 26 (step 213). In the DB update work, the result of the execution of DB update is confirmed, and a return code is returned to the update processing distributing part 24 (step 214). At the update processing distributing part 24, the returned return code is examined, necessary post-processing is performed, and then a return code is returned to the data processing part 50 (step 215). If the received return code is normal, then the block terminating part 54 of the data processing part 50 confirms that processing of the data update request has ended, and outputs a control message to the control queue 22 (step 216). Then, the entire control part 51 sets a synchronization point of the data processing part 50, and finalizes database update processing with an data update request (step 217). The process then returns to step 205 shown in FIG. 7.

In case of any program fault resulting when the DB update part 25 attempts to perform an update to the database 26, the data processing part 50 performs roll-back processing for the update database and the data update request to return them to the original state and the original location. That is, in order to hold processing of an data update request being processed in the DB update work in which the fault has been caused, the back-out part 56 outputs an appropriate control message to the hold queue 23. The original control message acquired by the user request taking-out part 53 is used as the control message to be output.

Thus, in accordance with the objects of the present invention, the input processing part 30 logically associates multiple blocks of data update requests with one another as a package, and a control message describing the contents thereof is created and stored in the control queue 22. The block for updating a database is stored in the data queue 21 as data update requests. That is, in order to realize high-speed processing of mass data, a new component, a control queue 22, and blocking and packaging of data update requests are performed to implement parallel processing and prevent database contention. The data processing part 50 reads a control message from the control queue 22 and acquires an associated data update request from the data queue 21 to cause DB update processing to be performed. In this way, by sharing one control queue 22 among multiple data processing parts (streamers) 50, the data processing parts (streamers) can process individual package units in parallel. This improves database update processing performance (processing efficiency). Furthermore, by sorting in advance, keys of update data to be packaged, database contention can be minimized. In addition, as for data update requests requiring the DB update order to be kept, sequential processing can be performed by packaging such data update requests in one package. This is especially effective when continuous paying-in and paying-out processing are performed in a banking system, for example. In case any fault occurs, data processing is held for the package unit including data which has caused the program fault. That is, a hold queue 23 is provided to temporarily hold a control message having package information in case any fault occurs in the DB update part 25 (DB update work), so that the control message is saved therein. This technique makes it possible to bypass the faulty data update request without moving it from the data queue 21 and thereby process other data update requests in other packages. This enables countermeasures to be automatically taken rapidly against a fault caused during mass processing.

Based on the foregoing, a system, method and program for performing parallel processing of data update requests have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for processing a multiplicity of data update requests made by a customer, said method comprising the steps of:
grouping all of said data update requests which is followed by updating of the corresponding data into a predetermined plurality of blocks for execution by a data processor, the data update requests within each of said blocks and from one of said blocks to a next one of said blocks being arranged in an order that said data update requests need to be executed to yield a proper data result, each of said blocks having approximately a same capacity for said data update requests, said capacity corresponding to a number of said data update requests which said data processor is adapted to efficiently process in order before processing said data update requests in the next one of said blocks; and
then said data processor processing said data update requests within said one block in said order, and then said data processor processing said data update requests within said next block in said order;
wherein the processing the multiplicity of data update requests is performed only for the data update requests.

2. A method as set forth in claim 1 wherein said order is an order in which said data update requests were made.

3. A method as set forth in claim 1 wherein:
said capacity corresponds to a number of said data update requests which said data processing unit is adapted to optimally process in order in said one block before processing said data update requests in said next one of said blocks.

4. A method as set forth in claim 1 wherein said data update requests within each of said blocks are arranged into said order by order information stored within or associated with said blocks.

5. The method according to claim 1, wherein the grouping of all of said data update requests into the plurality of blocks is performed at a same time.

6. The method according to claim 1, wherein said blocks contain a predetermined number of the data update requests.

7. The method according to claim 1, wherein said blocks are grouped into a package according to a common key among the blocks.

8. A system for processing a multiplicity of data update requests made by a customer, said system comprising:
means for grouping all of said data update requests stored in a database which is followed by updating of the corresponding data into a predetermined plurality of blocks for execution by a data processor, the data update requests within each of said blocks and from one of said blocks to a next one of said blocks being arranged in an order that said data update requests need to be executed to yield a proper data result, each of said blocks having approximately a same capacity for said data update requests, said capacity corresponding to a number of said data update requests which said data processor is adapted to efficiently process in order before processing said data update requests in the next one of said blocks;
said data processor including means for then processing said data update requests within said one block in said order;
said data processor including means for then processing said data update requests within said next block in said order;
wherein the processing the multiplicity of data update requests is performed only for the data update requests.

9. A system as set forth in claim 8 wherein said order is ma order in which said data update requests were made.

10. A system as set forth in claim 8 wherein:
said capacity corresponds to a number of said data update requests which said data processing unit is adapted to optimally process in order in said one block before processing said data update requests in said next one of said blacks.

11. A computer program product stored on a computer readable medium for processing a multiplicity of data update requests made by a customer, said computer program product comprising:
first program instructions to group all of said data update requests which is followed by updating of the corresponding data into a predetermined plurality of blocks for execution by a data processor, the data update requests within each of said blocks and from one of said blocks to a next one of said blocks being arranged in an order that said data update requests need to be executed to yield a proper data result, each of said blocks having approximately a same capacity for said data update requests, said capacity corresponding to a number of said data update requests which said data processor is adapted to efficiently process in order before processing said data update requests in the next one of said blocks; and
second program instructions within said data processor to ten process said data update requests within said one block in said order, and third program instructions within said data processor to then process said data update requests within said next block in said order; and wherein
said first, second and third program instructions we recorded on said medium;
wherein the processing the multiplicity of data update requests is performed only for the data update requests.

12. A computer program product as set forth in claim 11 wherein said order is an order in which said data update requests were made.

13. A computer program product as set forth in claim 11 wherein:
said capacity corresponds to a number of said data update requests which said data processing unit is adapted to optimally process in order in said one block before processing said data update requests in said next one of said blocks.

14. A method for processing a multiplicity of first data update requests made by a first customer and a multiplicity of second data update requests made by a second customer, said method comprising the steps of:
grouping all of said first data update requests which is followed by updating of the corresponding data into a predetermined plurality of first blocks for execution by a first data processor unit, the first data update requests within each of said first blocks and from one of said first blocks to a next one of said first blacks being arranged in a first order that said first data update requests need to be executed to yield a proper data result, each of said first blocks having approximately a same first capacity for said first data update requests, said first capacity corresponding to a number of said first data update requests which said first data processing unit is adapted to efficiently process in order before processing said first data update requests in the next one of said first blocks, and ten said first data processing unit processing said first data update requests within said one first block in said first order, and then said first data processing unit processing said first data update requests within said next first block in said first order; and after performing grouping of all of said first data update requests, grouping all of said second data update requests into a plurality of second blocks for execution by a second data processor unit, the second data update requests within each of said second blocks and from one of said second blocks to a next one of said second blocks being arranged in a first order that said second data update requests need to be executed to yield a proper data result, each of said second blocks having approximately a same second capacity for said second data update requests, said second capacity corresponding to a number of said second data update requests which said second data processing unit is adapted to efficiently process in order before processing said second data update requests in the next one of said second blocks, and then said second data processing unit processing said second data update requests within said one second block in said second order, and then said second data processing unit processing said second data update requests within said next second block in said second order, wherein the processing the multiplicity of data update requests is performed only for the data update requests.

15. A method as set forth in claim 14 wherein said first order is an order in which said first data update requests were made, and said second order is an order in which said second data update requests were made.

16. A method as set forth in claim 14 wherein:

said first capacity corresponds to a number of said first data update requests which said first data processing unit is adapted to optimally process in order in said one first block before processing said first data update requests in the next one of said first blocks; and said second capacity corresponds to a number of said second data update requests which said second data processing unit is adapted to optimally process in order in said one second block before processing said second data update requests in the next one of said second blocks.

17. A method as set forth in claim 14 wherein said first data processing unit processes said first data update requests in parallel with said second data processing unit processing said second data update requests.

* * * * *

UNITED STATES PATENT AND TRADEMARK OFFICE
CERTIFICATE OF CORRECTION

| | | |
|---|---|---|
| PATENT NO. | : 7,593,947 B2 | Page 1 of 1 |
| APPLICATION NO. | : 10/802471 | |
| DATED | : September 22, 2009 | |
| INVENTOR(S) | : Nagai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this

Twenty-eighth Day of September, 2010

David J. Kappos
*Director of the United States Patent and Trademark Office*